(12) United States Patent
Giraldin et al.

(10) Patent No.: US 7,114,647 B2
(45) Date of Patent: Oct. 3, 2006

(54) DATA ANALYSIS SYSTEM AND METHOD

(75) Inventors: Timothy W. Giraldin, Ladera Ranch, CA (US); Patrick W. Giraldin, Ladera Ranch, CA (US); Regan E. Kelly, Laguna Niguel, CA (US); Martin F. Crowley, Lake Forest, CA (US); Eric Couch, Trabuco Canyon, CA (US); Y-Tin Gross, Ladera Ranch, CA (US)

(73) Assignee: SafeTzone Technologies Corp., Laguna Hills, CA (US)

( * ) Notice: Subject to any disclaimer, the term of this patent is extended or adjusted under 35 U.S.C. 154(b) by 0 days.

(21) Appl. No.: 10/716,691

(22) Filed: Nov. 18, 2003

(65) Prior Publication Data

US 2004/0103020 A1 May 27, 2004

Related U.S. Application Data

(60) Provisional application No. 60/427,713, filed on Nov. 19, 2002, provisional application No. 60/427,901, filed on Nov. 19, 2002, provisional application No. 60/427,874, filed on Nov. 19, 2002, provisional application No. 60/427,875, filed on Nov. 19, 2002, provisional application No. 60/427,731, filed on Nov. 19, 2002.

(51) Int. Cl.
*G06F 17/00* (2006.01)

(52) U.S. Cl. .................. 235/375; 340/825.49; 340/5.2; 455/456.1

(58) Field of Classification Search ................ 235/375; 340/825.49, 150, 5.2; 705/14, 26, 10, 13; 455/456.1, 458, 459
See application file for complete search history.

(56) References Cited

U.S. PATENT DOCUMENTS

| | | | | |
|---|---|---|---|---|
| 4,275,385 A | * | 6/1981 | White | 340/825.49 |
| 4,495,496 A | * | 1/1985 | Miller, III | 340/10.2 |
| 5,438,321 A | | 8/1995 | Bernard et al. | |
| 5,566,327 A | | 10/1996 | Sehr | |
| 5,889,474 A | * | 3/1999 | LaDue | 340/825.49 |
| 5,987,421 A | * | 11/1999 | Chuang | 705/7 |
| 6,052,675 A | | 4/2000 | Checchio | |
| 6,657,543 B1 | | 12/2003 | Chung | |
| 2002/0082897 A1 | * | 6/2002 | Menelly et al. | 705/10 |
| 2002/0087409 A1 | * | 7/2002 | Joao | 705/14 |
| 2002/0120530 A1 | * | 8/2002 | Sutton et al. | 705/26 |
| 2002/0152120 A1 | * | 10/2002 | Howington | 705/14 |
| 2003/0107649 A1 | * | 6/2003 | Flickner et al. | 348/150 |

* cited by examiner

*Primary Examiner*—Thien M. Le
*Assistant Examiner*—Daniel A. Hess
(74) *Attorney, Agent, or Firm*—Duckor Spradling Metzger & Wynne; Bernard L. Kleinke

(57) ABSTRACT

A system and method of communication for a confined area of a facility are disclosed. Personal identification information of a guest is received into at least one of a set of stations distributed throughout the confined area to register the guest. Demographic information regarding the registered guest is received. The movement of the guest is monitored over time, and the guest movement information is stored. Reports are created on the demographic and movements of the guest.

18 Claims, 3 Drawing Sheets

Data Management Diagram

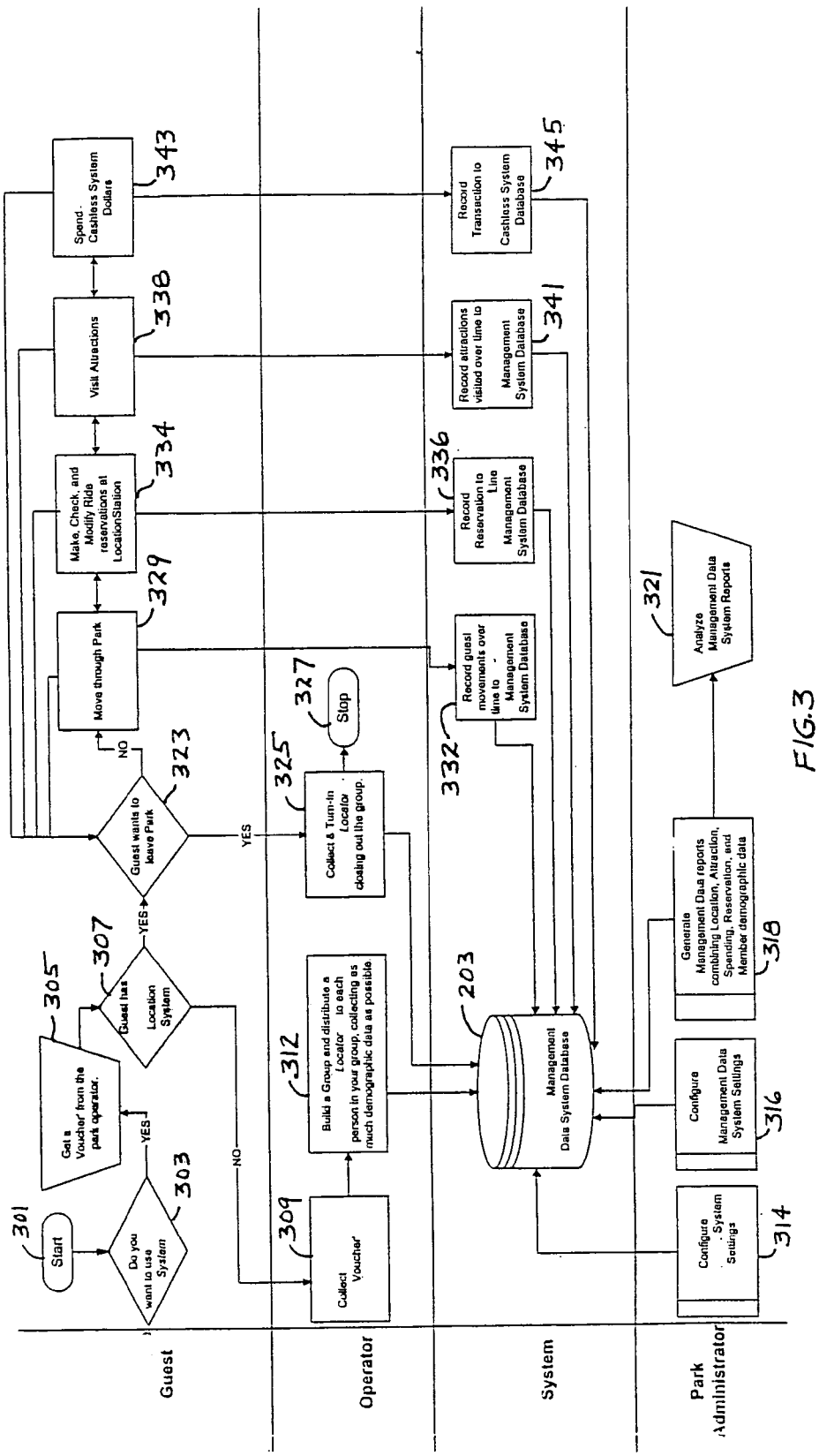

DATA ANALYSIS SYSTEM AND METHOD

RELATED APPLICATION

The following applications are related to the present invention and are hereby incorporated by reference in their entirety: U.S. patent application, Ser. No. 09/992,872, titled "IDENTIFICATION TAG FOR REAL-TIME LOCATION OF PEOPLE," filed Nov. 13, 2001, and U.S. patent application, Ser. No. 09/992,668, filed Nov. 13, 2001 and titled "System for Real-Time Location of People in a Fixed Environment."

This application claims priority to the following provisional applications and are hereby incorporated by reference in their entirety: U.S. Provisional Patent Application, Serial No. 60/427,901, titled MESSAGE COMMUNICATION SYSTEM AND METHOD, filed Nov. 19, 2002, U.S. Provisional Patent Application, Serial No. 60/427,874, titled QUEUE MANAGEMENT SYSTEM AND METHOD, filed Nov. 19, 2002, U.S. Provisional Patent Application, Serial No. 60/427,875, titled ROUTE PLANNING SYSTEM AND METHOD, filed Nov. 19, 2002, U.S. U.S. Provisional Patent Application, Serial No. 60/427,731, titled CASHLESS SPENDING SYSTEM AND METHOD, filed Nov. 19, 2002, and U.S. Provisional Patent Application, Serial No. 60/427,713, titled DATA ANALYSIS SYSTEM AND METHOD, filed Nov. 19, 2002.

This application claims priority to the following non-provisional applications and are hereby incorporated by reference in their entirety: U.S. Non-provisional Patent Application, Ser. No. 10/716,583, titled MESSAGE COMMUNICATION SYSTEM AND METHOD, filed Nov. 18, 2003, U.S. Non-provisional Patent Application, Ser. No. 10/717,052, titled QUEUE MANAGEMENT SYSTEM AND METHOD, filed Nov. 18, 2003, U.S. Non-provisional Patent Application. Ser. No. 10/716,800, titled ROUTE PLANNING SYSTEM AND METHOD, filed Nov. 18, 2003, U.S. Non-provisional Patent Application, Ser. No. 10/716,802, titled CASHLESS SPENDING SYSTEM AND METHOD, filed Nov. 18, 2003.

BACKGROUND OF THE INVENTION

1. Field of the Invention

The present invention relates in general to a data analysis system and method. It more particularly relates to a data analysis system and method, which may be used in confined areas of facilities such as amusement parks, theme parks, large retail stores, ships, casinos and others.

2. Background Art

There is no admission that any of the background art disclosed in this section legally constitutes prior art.

Large confined areas of facilities, such as amusement parks, theme parks, large retail stores, casinos, ships, and others, invite people to enter their facility for acquiring various goods and/or services. When the goods and/or services are distributed throughout a large confined area, the patrons typically wander either purposefully or randomly throughout the facility while determining which goods and/ or services are to be procured.

It would be desirable to help facilitate the use of the facility while the patrons are present within the confined area of the facility.

BRIEF DESCRIPTION OF THE DRAWINGS

The following is a brief description of the drawings:

FIG. 3 is a flow chart diagram of a data analysis method according to a disclosed embodiment of the present invention.

DESCRIPTION OF CERTAIN EMBODIMENTS IN THE INVENTION

Figure 1:
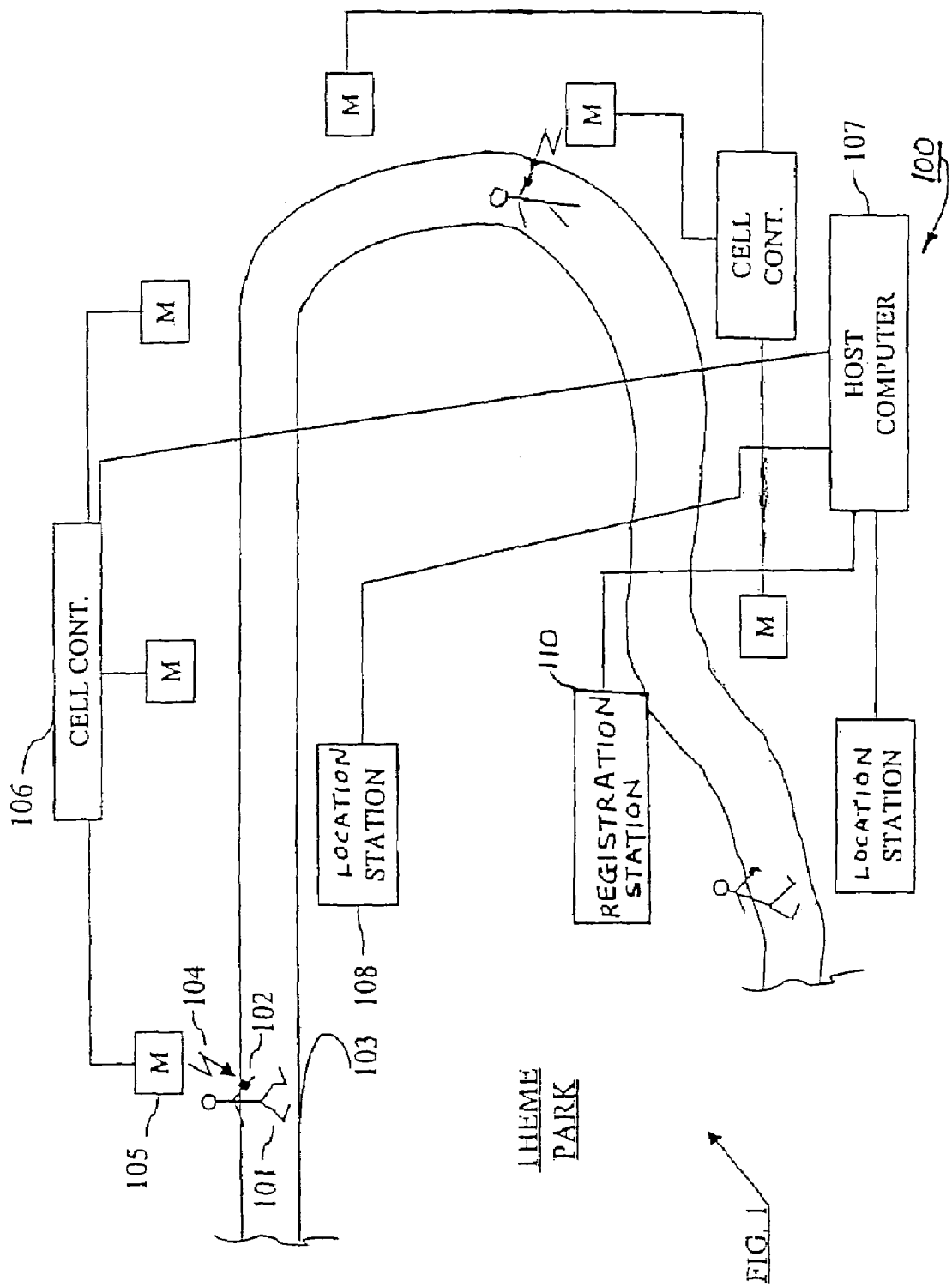
FIG. 1 is a diagrammatic view of a person locating system, which is constructed according to an embodiment of the invention.

A system and method of communication for a confined area of a facility are disclosed. Personal identification information of a guest is received into at least one of a set of stations distributed throughout the confined area to register the guest. Demographic information regarding the registered guest is received. The movement of the guest is monitored over time, and the guest movement information is stored. Reports are created on the demographic and movements of the guest.

According to a disclosed embodiment of the invention, a data analysis system and method enables the monitoring, storing and retrieving of information regarding the patrons use of a confined facility. The information includes demographic information including age, gender and the like, patterns of movement of patrons through the confined facility, as well as other information.

According to other disclosed embodiments of the invention, such a system and method also monitors, stores and retrieves information relating to cashless spending history at various locations or stations throughout the confined area to determine spending habits of patrons according to a disclosed embodiment of the invention. Other disclosed embodiments of the invention relate to such a system and method, which also monitors, stores and retrieves information relating to queue management for various attractions throughout the confined area to determine patterns of patron behavior while utilizing the confined facility.

According to another disclosed embodiment, a ledger or other report, can be generated by the management of the facility to determine information relating to habits of patrons while using the facility. In this regard, information stored concerning the patrons may be sorted such as by demographics information concerning the age group of patrons using the facility. For example, in connection with an amusement or theme park, it may be desirable to know which age groups spend the most money at any given location, such as a given restaurant. It may also be desirable to know which age groups use which rides in the amusement or theme park. This is accomplished by sorting information relating to the habits of the patron while using the facility as to the demographic information of the patron.

Such information may well be used for targeted advertisements for attracting former patrons as well as new patrons to the facility. Also, the information can be gathered for certain intervals of time such as a day, a week, a month or an entire year. This enables the park management to know how to adjust the timing of attractions to other facilities at certain times during the day.

It is frequently desirable on the part of the management of the facility to know the habits of the patrons so that the attractions, displays, and other facilities within the confined area can be arranged advantageously. In this regard, when knowing the typical habits and patterns of behavior of the patrons, various displays and attractions can be arranged and distributed throughout the confined facility to increase sales and use of the facilities accordingly.

As an example, in an amusement or theme park environment, there can be certain times during the day when large numbers of the patrons converge on certain facilities, such as restaurants, in the park. It may be useful to know when these times occur, so that the scheduling of other attractions, such as rides, can be adjusted to coordinate the facilities more appropriately. Thus, the patrons are better able to utilize the attractions within the park facilities.

Person Locating System

Many patrons who visit large confined commercial facilities of a facility such as zoos, waterparks, theme parks, amusement parks, large retail stores, casinos, ships and others have at some point, experienced the feeling of temporarily losing another member of their group or family. It may be easy under some circumstances for an individual to become lost in a crowd, where the person only a short distance such as twenty feet away from the rest of the group and yet the group may not be able to find him or her.

As shown in FIG. 1, an interactive person locating system 100 employs location stations such as station 108 distributed throughout the confined area to facilitate communication between and among member of the groups of patrons such as patron 101. A registration station 110 enables patrons to register their group so that members of the registered group can communicate privately with one another.

Group members or guests who interact with the system, at any location station, have the ability to visually discover the location of their group members on an electronic version of the facility or park map.

The members or guests are thus empowered to become a part of the solution in finding one another; to give them the ability to at least know where the rest of the party is when they cannot be found, or when they become separated by choice or by accident; to eliminate the feeling of panic that sweeps over a parent when they realize that a member of their group, such as their child, is not by their side or at the designated meeting place.

It helps for group members such as parents to know promptly that their children are still in the park, waiting in line for a ride or just running late.

Each member of a group obtains a waterproof transmitter in the form of a locator or personal identification (i.d.) tag 102 that is worn on the wrist or other part of the body or on the person's clothing. This locator continually communicates, via radio signal, with the child locating system 10 to update his or her location throughout the day. One example of such a tag is dislocated in the foregoing mentioned non-provisional patent application Serial No. 09/992,872.

The location station 108 is a strategically placed interactive viewable workstation kiosk. These stations allow unaided guest access to the system with the locator 102. This gives the guest the ability to locate and view any locators in their group, to post messages on a private message board or to contact security. It also allows users to interact with any other system feature of module.

The registration station 110 is an interactive viewable workstation used by the park. The registration station 110 software module activates the locating software by enabling quick and easy registration of groups and individuals into the system 100 so that the system distinguishes between groups and between individuals within groups.

The confined area such as a park is divided into zones. These zones are the areas inside the property where guests need to be located. A zone can be as large or as small as needed. They can also be adjusted, expanded or minimized as necessary.

Guests are tracked as they pass along a path 103 through these zones via antennas such as an antenna 105 that are strategically placed throughout the property. These antennas, in return, send the tracking information to cell controllers such as cell controller 106, which conveys the information back to the central processing server or host computer 107 utilizing a wireless network. One example of such a system for the real-time location of people in a fixed environment is disclosed in the foregoing mentioned non-provisional patent application Serial No. 09/992,668.

The data analysis system and method of the disclosed embodiments of the invention include a software module and provide a powerful benefit of the person locating system 100. It enables the collection, organization and storage of critical data relative to guest traffic and spending patterns. Once installed, the person locating system 100 can provide detailed information on guests' activities. The system stores the time and location when a guest locator or personal identification (i.d.) tag such as a tag 102 passes through the zones created throughout the property of the confined area.

The system can be configured to accumulate specific demographic data that describes each guest by assigning information such as age, gender, point of origin, or other specific interest, to each unique guest i.d. tag.

The disclosed methods of the presently preferred embodiments of the invention for accumulating this data can be tailored based on the specific needs and requirements of each confined facility by using the registration station 110, or by taking short surveys on the location stations such as the location station 108.

The data analysis system software module is seamlessly integrated with all other modules of the system 100. However, it is to be understood that the data analysis system and method may be partially integrated, or used in a stand alone mode of operation.

Some benefits that are realized with the implementation of the data analysis system and method include, but are not limited to, the insight to where guests travel throughout their visit to the facility. Knowledge where the majority or large numbers of guests are located at a given point in the day such as at parade routes, line queues and others is useful to the management of the facility for a variety of purposes, such as the physical arrangement of the attractions and amenities throughout the facility, determining and coordinating the timing of the attractions and events, as well as other purposes.

Also, the traffic patterns can be determined through particular zones of the facility (attractions, gift shops, plaza areas). Analysis of guest spending habits when used in conjunction with the cashless spending module can be obtained. Detailed attraction analysis with the line management module can be achieved.

The results of the analysis helps the facility make more informed decisions regarding the addition of guest amenities such as services, as well as attractions and placement of retail shops and restaurants.

Figure 2:
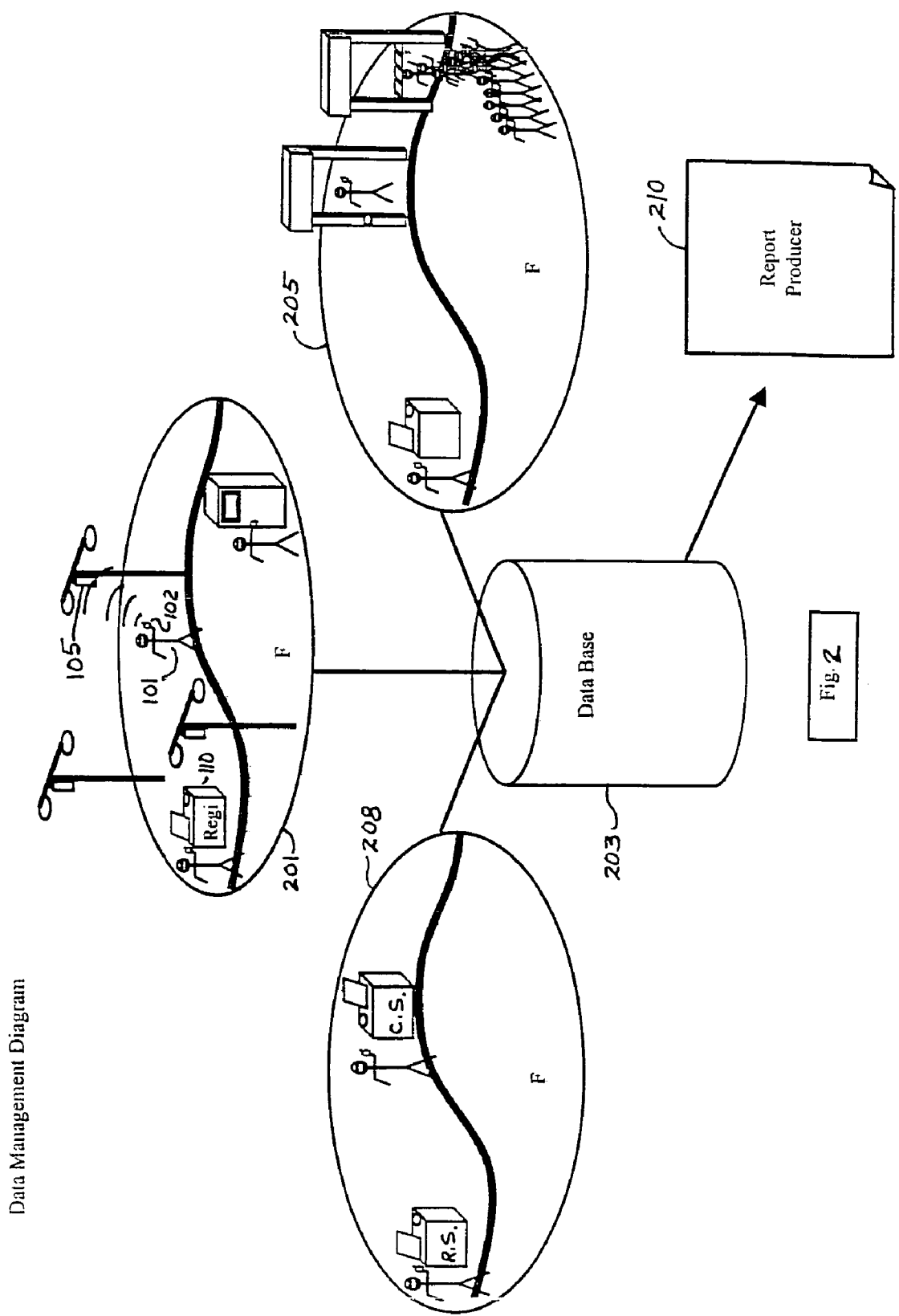
FIG. 2 is a diagrammatic view of the data analysis system as utilized by the system of FIG. 1 according to an embodiment of the invention.

Considering now the data analysis system and method in greater detail, the guest or group may be required to be registered as a user via registration station 110 (FIG. 1) of the person locating system 100 (FIG. 1) in order for the park or other facility to store the data analysis function. As shown in FIG. 2, the system stores a record or file of guest movements over time as indicated at 201, on a management database 203 of the host computer 107 (FIG. 1).

The system stores a record or file of the reservations in the, queue management as indicated at 205 in the data base 203. The system also stores a record or file of transactions completed using the cashless system as indicated at 208 in the data base 203.

The park or other facility can then search the data base 203 and configure the system settings to generate management data reports such as a report 210. The reports combine location, reservation, and member demographic data into reports for use by the park in operating the park or other facility.

Referring now to FIG. 3, the data analysis method according to the disclosed embodiment of the invention will now be described. As indicated at box 301, the method is started, and then a decision is made as to whether or not the guest desires to use the person locating system 100 (FIG. 1) as indicated at box 303. As indicated at box 305, assuming that the person desires to utilize the system, the guest may receive a voucher from the park operator. As indicated at box 307, a decision is made as to whether or not the guest has then registered in the system 100. If not, as indicated at box 309, the park operator collects the voucher and enters the information in the system as indicated at box 312 to establish the guest and his or her group as being registered in the system. In so doing, each guest or member in the group is provided with a locator or identification tag. Also, the operator collects as much demographic information as possible concerning the members of the group and enters it into the system data base 203 via the registration station 110 (FIG. 1).

The park administrator can configure the system settings as indicated at box 314. Also, the park administrator can also configure the management data system settings as indicated at box 316. Additionally, the park administrator can also generate the management data reports, such as the report 210 (FIG. 2), combining the location patterns of guests, attractions, spending, reservation, and member demographic data. As indicated at box 321, the park administrator can then analyze the management data system reports to facilitate the operation of the park.

Once the guest has properly registered with the system, then as indicated at box 323, a determination is made whether or not the guest desires to leave the park or the facility in question. If the guest does so desire, then as indicated at box 325, the operator collects and turns in the locator or identification tag and closes out the group. This is done by entering the information in the registration station to store it in the management data system data base 203 to then stop the process as indicated at box 327.

On the other hand, if the guest desires to continue utilizing the facilities, then as indicated at box 329, the guest or group member is able to move throughout the facility to utilize its services and purchase goods. The system records the movements of the guest in the management data system data base 203 as indicated at box 332.

The guest may make, check, and modify ride reservations in the location station 108 as indicated at 334, and as indicated at box 336, the reservations are recorded in the line management system data base which is stored in the management data system data base 203.

As the guest or group member visits attractions or amenities as indicated at box 338, the attractions are recorded as they are visited and stored in the management system data base as stored on the management data system data base 203 as indicated at box 341. Also, as the guest utilizes the cashless system spending in the facility as indicated at box 343, each transaction is recorded to the cashless system data base as indicated at box 345, which is stored on the management data system data base 203.

While particular embodiments of the present invention have been disclosed, it is to be understood that various different modifications and combinations are possible and are contemplated within the true spirit and scope of the embodiments disclosed herein and the appended claims. There is no intention, therefore, of limitations to the exact disclosure herein presented.

What is claimed is:

1. A method of communication for a facility comprising:
  locating monitoring equipment in each of a plurality of zones covering substantially the entire facility;
  receiving personal identification information of a plurality of guests into at least one of a set of stations distributed throughout the entire facility;
  receiving demographic information regarding the registered guests;
  continually monitoring movement of the guests over time within the entire facility as they pass through the zones;
  determining at any time locations within the entire facility of all members of a group;
  displaying the locations of all members of the group to any of the members of the group, the group inducing at least two of the plurality of guests,
  storing guest movement infiltration;
  creating reports on the demographics and continuous movements of the guests as they move about the entire facility;
  determining guest common traffic patterns anywhere throughout the entire facility at any time based on the continuous movements of the guests throughout the entire facility; and
  analyzing the traffic patterns of the guests to determine timing and location of amenities within the entire facility.

2. A method according to claim 1, further including storing information relating to the cashless spending history of the guests at various stations throughout the facility.

3. A method according to claim 2, further including determining spending habits of the guests in response to the stored cashless spending history.

4. A system method according to claim 1, further including sorting information relating to habits of the guests while using the facility as to the demographic information of the guests.

5. A method according to claim 4, further including storing attraction reservations entered by the guests.

6. A method according to claim 5, further including creating reports an the cashless spending habits of the guests and on the attraction reservations made by the guests.

7. A system of communication for a facility comprising:
  means for locating monitoring equipment in each of a plurality of zones covering substantially the entire facility;
  means for receiving personal identification information of a plurality of guests into at least one of a set of stations distributed throughout the entire facility;
  means for receiving demographic information regarding the registered guests;
  means for continually monitoring movement of the guests over time within the entire facility as they pass through the zones;
  means for determining at any time locations within the entire facility of all members of a group;
  means for displaying the locations of all members of the group to any of the members of the group, the group including at least two of the plurality of guests,
  means for storing guest movement information;

means for creating reports on the demographics and continuous movements of the guests as they move about the entire facility;

means for determining guest common traffic patterns anywhere throughout the entire facility at any time base one the continuous movements of the guests throughout the entire facility; and means for analyzing the traffic patterns of the guests to determine timing and location of amenities within the entire facility.

8. A system according to claim 7, further including means for storing information relating to the cashless spending history of the guests at various stations throughout the facility.

9. A system according to claim 8, further including means for determining spending habits of the guests in response to the stored cashless spending history.

10. A system according to claim 7, further including means for sorting information relating to habits of the guests while using the facility as to the demographic information of the guests.

11. A system according to claim 10, further including means for storing attraction reservations entered by the guests.

12. A system according to claim 11, further including means for creating reports on the cashless spending habits of the guests arid on the attraction reservations made by the guests.

13. A software system of communication for a facility, comprising:

module for locating monitoring equipment in each of a plurality of zones covering substantially the entire facility;

module for receiving personal Identification information of a plurality of guests into at least one of a set of stations distributed throughout the entire facility;

module for receiving demographic information regarding the registered guests;

module for continually monitoring movement of the guests over time within the entire facility as they pass through the zones;

module for determining at any time locations within the entire facility of all members of a group;

module for displaying the locations of all members of the group to any of the members of the group, the group including at least two of the plurality of guests, module for storing guest movement information;

module for creating reports on the demographics and continuous movements of the guests as they move about the entire facility; and module for determining guest common traffic patterns anywhere throughout the entire facility at any time based on the continuous movements of the guests throughout the entire facility; and module for analyzing the traffic patterns of the guests to determine timing and location of amenities within the entire facility.

14. A software system according to claim 13, further including module for storing information relating to the cashless spending history of the guests at various stations throughout the facility.

15. A software system according to claim 14, further including module for determining spending habits of the guests in response to the stored cashless spending history.

16. A software system according to claim 13, further including module for sorting information relating to habits of the guests while using the facility as to the demographic information of the guests.

17. A software system according to claim 16, further including module for storing attraction reservations entered by the guests.

18. A software system according to claim 17, further including module for creating reports on the cashless spending habits of the guests and on the attraction reservations made by the guests.

* * * * *